No. 654,897.  
G. J. KELLER.  
VEHICLE TIRE.  
(Application filed Sept. 19, 1899.)  
Patented July 31, 1900.
(No Model.)
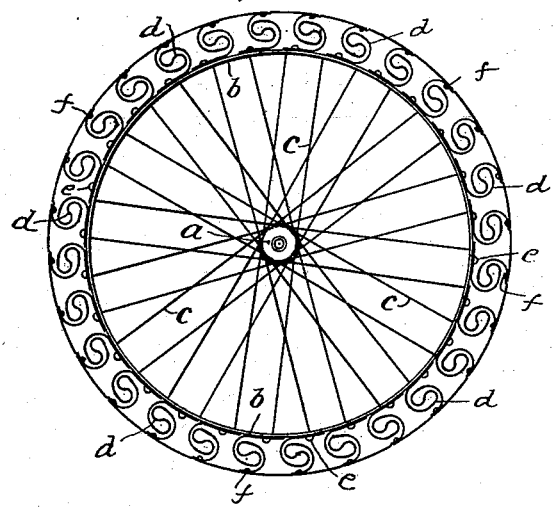
Fig. 1
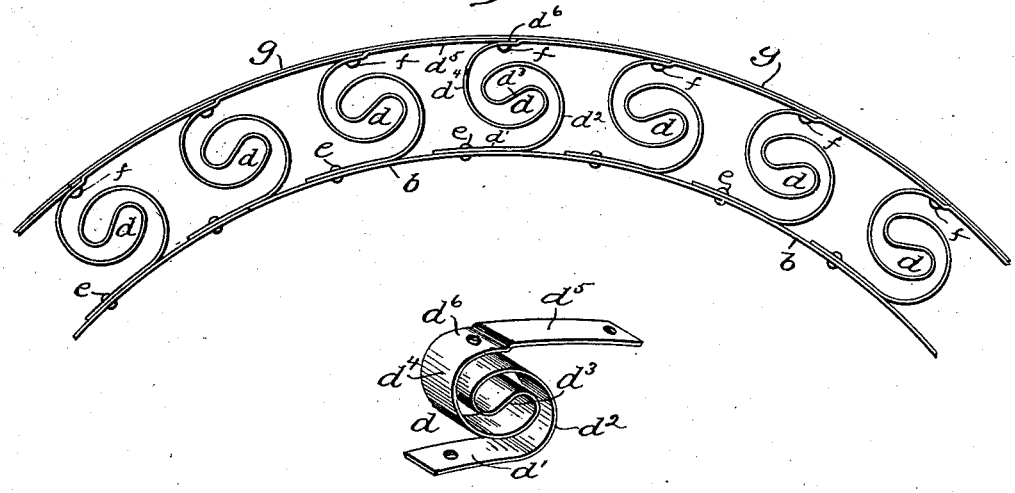
Fig. 2.
Fig. 3.
Witnesses:
Inventor:

UNITED STATES PATENT OFFICE.

GEORGE J. KELLER, OF PITTSBURG, PENNSYLVANIA, ASSIGNOR, BY MESNE ASSIGNMENTS, TO JOHN O'DONOVAN AND GEORGE J. KELLER, OF SAME PLACE, AND WILLIAM O'DONOVAN, OF CRAFTON, PENNSYLVANIA.

VEHICLE-TIRE.

SPECIFICATION forming part of Letters Patent No. 654,897, dated July 31, 1900.

Application filed September 19, 1899. Serial No. 730,993. (No model.)

*To all whom it may concern:*

Be it known that I, GEORGE J. KELLER, a resident of Pittsburg, in the county of Allegheny and State of Pennsylvania, have invented a new and useful Improvement in Vehicle-Tires; and I do hereby declare the following to be a full, clear, and exact description thereof.

My invention relates to vehicle-tires; and it has for its object to provide a cushion-tire which shall have the resiliency and other desirable functions of a pneumatic tire and at the same time have a longer life and be less liable to get out of repair.

Generally stated, my invention consists of a series of metal springs each of which comprises two approximately-concentric spirals rigidly joined at their inner ends and having their outer ends projecting in opposite directions to form two concentric rings. The inner spring ends may be riveted or bolted to a wheel-felly, and the outer ends may be either riveted together, so as to constitute the wheel-tread, or they may be reinforced by an outer band or rim.

To enable others skilled in the art to make and use my invention, I will describe the same more fully, referring to the accompanying drawings, in which—

Figure 1 is an elevation of a bicycle-wheel with my invention applied thereto. Fig. 2 is an elevation of a portion of the tire enlarged, and Fig. 3 is a perspective view of one of the springs which constitutes the essential feature of my invention.

In the drawings, the letter $a$ designates the hub of the wheel, which is connected to the felly $b$ by means of the spokes $c$. The construction of the wheel itself does not form any part of my invention, and only a general description thereof is therefore deemed necessary. I prefer to form the felly $b$ of a metal strip or band to which the spokes $c$ are attached in any desired manner. The metal springs $d$ are also secured to the outer periphery of the felly $b$ by bolts or rivets $e$. Any desired number of springs $d$ may be employed, they being arranged, preferably, at equal intervals around the felly. The width of the strips from which the springs are formed is substantially equal to the desired tread of the wheel, and each spring has a substantially-flat base portion $d'$, which is secured by one or more rivets $e$ to the felly $b$ of the wheel. The spring then curves up and around from the base portion $d'$, forming the first convolution, as shown at $d^2$, thence downward and back upon itself, as at $d^3$, then again reverses and forms the end convolution $d^4$, from which extends the end portion $d^5$, which is of sufficient length to meet an offset $d^6$ in the next spring, the two being secured together by means of one or more rivets $f$, as shown in Fig. 2. It will be seen that the spring thus formed constitutes a double intercoiled spiral, the two portions of which may have any number of turns or partial turns desired, provided they are either formed from a single strip of metal or have their inner ends rigidly joined together and are not materially shorter than those shown in the drawings. The springs are all made alike, and the whole series when connected to one another, as previously described, form a continuous tire, the portions $d^5$ forming a continuous band of metal, which may be used as the wheel-tread itself, or a strip or band $g$ of any desired substance—such as rubber, metal, wood, &c.—may be secured thereto, as shown in Fig. 2. A strip or band $g$ will probably be found desirable, since such strip when worn out may be replaced by a new one without renewing the springs.

On account of the double-spiral construction of the springs $d$ the tire responds to tangential and radial pressure with substantially-equal facility, thus providing an equal resilience in all directions, such as obtains with tires of pneumatic construction.

I am aware that prior to my invention it has been proposed to employ vehicle-tires embodying springs between the fellies and treads; but none of such proposed tires has embodied springs having either the structural or functional characteristics of those employed by me.

It will be understood that two or more springs may be formed from a single strip of metal, if found practicable and desirable, and that other minor variations from what is specifically illustrated may be made without departing from the spirit and scope of my invention.

Having now fully described my invention, what I claim, and desire to secure by Letters Patent, is—

1. A vehicle-tire comprising a series of circumferentially-arranged springs, each of which embodies two reversely-coiled spirals, in combination with annular bands to which the free ends of the springs are fastened, substantially as described.

2. A vehicle-tire comprising a series of circumferentially-arranged springs, each of which embodies two reversely-intercoiled spirals rigidly joined at their inner ends and having their outer ends projecting in opposite directions.

3. A vehicle-tire comprising a series of circumferentially-arranged springs, each of which embodies two reversely-intercoiled spirals rigidly joined at their inner ends and having oppositely-projecting outer ends, corresponding ends of adjacent springs being riveted together, thereby forming a continuous circumferential band.

4. A vehicle-tire comprising a series of circumferentially-arranged, intercoiled, double-spiral springs, the outer ends of which project in opposite directions and in concentric circumferential lines, the ends lying on the outer circumference being provided with offsets adjacent to the spiral portions, against which the adjacent spring ends abut, said parts being riveted together to form a continuous band.

5. A vehicle-tire comprising a series of intercoiled double-spiral springs, the free ends of which project in opposite directions to form concentric rings, the portions constituting the outer ring being offset and riveted together to form a smooth continuous surface.

6. A vehicle-tire comprising a series of double reversely-intercoiled spirals, the free ends of which project in opposite directions to form two concentric rings, the inner one of which is reinforced by a continuous band and the outer one of which has its adjacent parts riveted together to form a self-sustained continuous band.

In testimony whereof I, the said GEORGE J. KELLER, have hereunto set my hand.

GEORGE J. KELLER.

Witnesses:
ROBERT C. TOTTEN,
GRACE C. RAYMOND.